July 25, 1961

J. W. HEBERT 2,993,454

DOMESTIC INCINERATORS

Filed Aug. 8, 1956

INVENTOR.
John W. Hebert
BY
Searman + Searman
ATTORNEYS

July 25, 1961 J. W. HEBERT 2,993,454
DOMESTIC INCINERATORS
Filed Aug. 8, 1956 2 Sheets-Sheet 2

INVENTOR.
John W. Hebert
BY
Hanmant Hanmon
ATTORNEYS

United States Patent Office 2,993,454
Patented July 25, 1961

2,993,454
DOMESTIC INCINERATORS
John W. Hebert, Bay City, Mich., assignor to
Calcinator Corporation, Bay City, Mich.
Filed Aug. 8, 1956, Ser. No. 602,813
6 Claims. (Cl. 110—8)

This invention relates to domestic incinerators of the general type adapted to the burning of raw garbage and other combustible office and house wastes and refuse, including outmoded wearing apparel and papers of all kinds.

In the operation of incinerators designed for burning garbage, trash and papers within a building, smoke and odiferous fumes are given off as the products of combustion, travel through a flue system to a chimney or the like and are discharged to atmosphere. The discharge of odor-bearing fumes is of course, objectionable, and is complicated by various variable factors such as temperature within the incinerator, and the length of time required to dry the wet garbage so that it is readily combustible.

One of the prime objects of the invention is to design a means and method for drying and aerating the wet garbage, etc., fed to the incinerator, to increase the air circulation within the combustion chamber, minimize the smoldering and drying period, and provide for a more uniform and better distribution of heat and air to the garbage being consumed, thus combustible odor-bearing off-gases and the like are minimized and consumed so that there is no backing up of the off-gases in the incinerator and/or in the room in which the incinerator is installed.

A further object of the invention is to design a combustion chamber having corrugated walls and a simple, protective burner shield provided with laterally projecting deflection fins for diverting flames towards the sides of the combustion chamber for thorough contact with the entire bottom area of the material to be consumed instead of at one spot. With the spot burning, the outer layer of the refuse is quickly carbonized, and this carbonizing insulates the flame from the refuse, or it creates a channel through the body of the refuse, which in turn, causes smoldering and a loss in efficiency.

The corrugations in the walls of the combustion chamber provide air passages, when refuse is loaded therein, thus increasing the air circulation within the combustion chamber, and promoting a more efficient rate of combustion, it also tends to eliminate the possibility of packages (wrapped garbage) from wedging against the side walls of the chamber, which in a smooth wall surface, prevents ignition and promotes smoldering, due to lack of air flow and combustion.

A further object is to provide a protective burner shield which divides the burner flame into a plurality of individual flame streams for thoroughly heating the shield; spreading the flame over and in contact with the entire bottom area of the material to be consumed. This division and deflection of the flame together with the corrugations in the combustion chamber, permits air to circulate around the body of the refuse, and prevents refuse buildup along the sides.

Another object still is to provide a protective burner shield which serves to protect the burner and prevent smothering of the flame, and which also divides the main torch-like flame into a plurality of smaller torch flames, diverting them to the sides of the combustion chamber where the corrugations in the side walls of the chamber permit air to circulate around the refuse and prevent any refuse buildup at the sides, thus providing complete circulation of air and flames and aiding greatly in the destruction of refuse with adequate air for complete combustion.

Still a further object is to provide means for drying or dehydrating the garbage between operating periods, thus resulting in more rapid and complete combustion, minimizing off-gases resulting from smoldering and giving off less distillate during the burning period.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction without departing from the spirit, or sacrificing any of the advantages of the invention.

Figure 2:
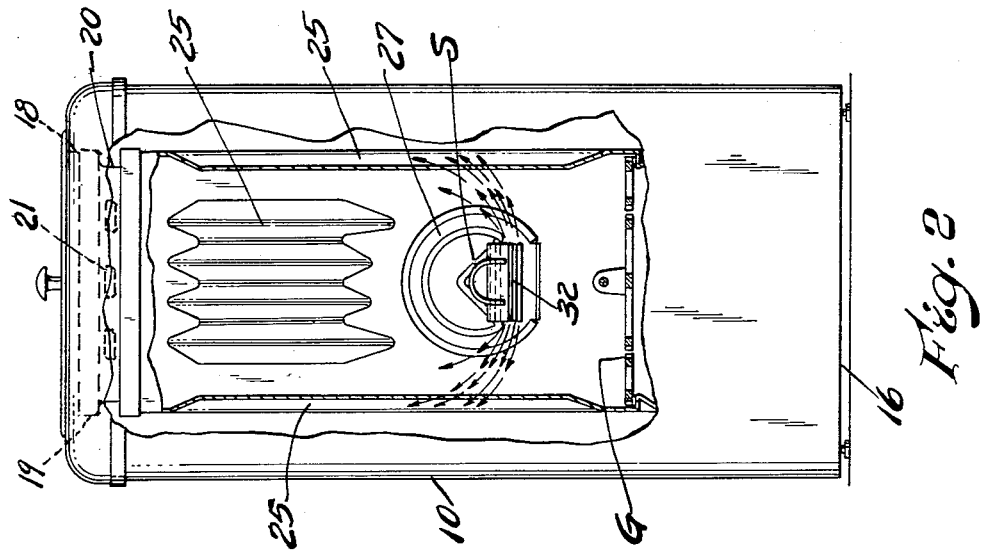
FIG. 2 is a rear elevational view, parts being broken away to show the burner shield and corrugated wall, the arrows indicating the direction of travel of the various flame streams.

Referring now more specifically to the drawings in which I have shown a preferred embodiment of my invention, and in which I have shown a downdraft type household incinerator, a numeral 10 indicates an outer housing provided with insulation 11 as usual. Mounted within the housing 10, and concentric therewith, is an inner shell 12 forming a primary combustion chamber D, the chamber having a hingedly connected perforated, division plate 13 bearing against stops 14 and a perforate grate G forming the bottom of the chamber. The space between the members 10 and 12 defines air passages 15 which lead from the base 16 to the upper end of the inner shell 12.

Charging openings 17 and 18 are provided in the upper ends of the members or casings 10 and 12 to receive a door frame, and the usual fabricated door frame 19 is mounted therein, the depending skirt 20 of the frame being perforated as at 21 so that air drawn upwardly between the walls of the inner and outer shell in the conventional manner will flow through the perforations 21 and thence downwardly into the combustion chamber D.

Horizontally aligned flue openings 22 and 23 are provided in the inner and outer shell respectively, and the perforated division plate 13 is hung in the combustion chamber at 24, the lugs 14 provided on the side walls of the chamber limiting rearward movement of the division plate which divides the chamber and confines the combustible matter in the front section as shown. Division plate 13 constitutes partitioning means dividing the primary combustion chamber D into a refuse burning section forwardly of the perforated plate 13 and a combustion gas collection section behind the plate 13.

The side and front walls of the combustion chamber are corrugated as indicated at 25 and for a specific purpose as will be hereinafter described, and an opening 26 is provided in the front wall of the inner shell 12 with a burner panel 27 forming a closure for same.

A burner assembly B is mounted on the frame or panel 27, and a fuel line 28 is connected to the burner assembly for automatically feeding fuel to the said burner, a conventional pilot P being located directly adjacent thereto as usual. Any burner assembly on the market may be used of the many which are capable of producing an elongated, torch like flame from their terminal ends or nozzles.

Figure 1:
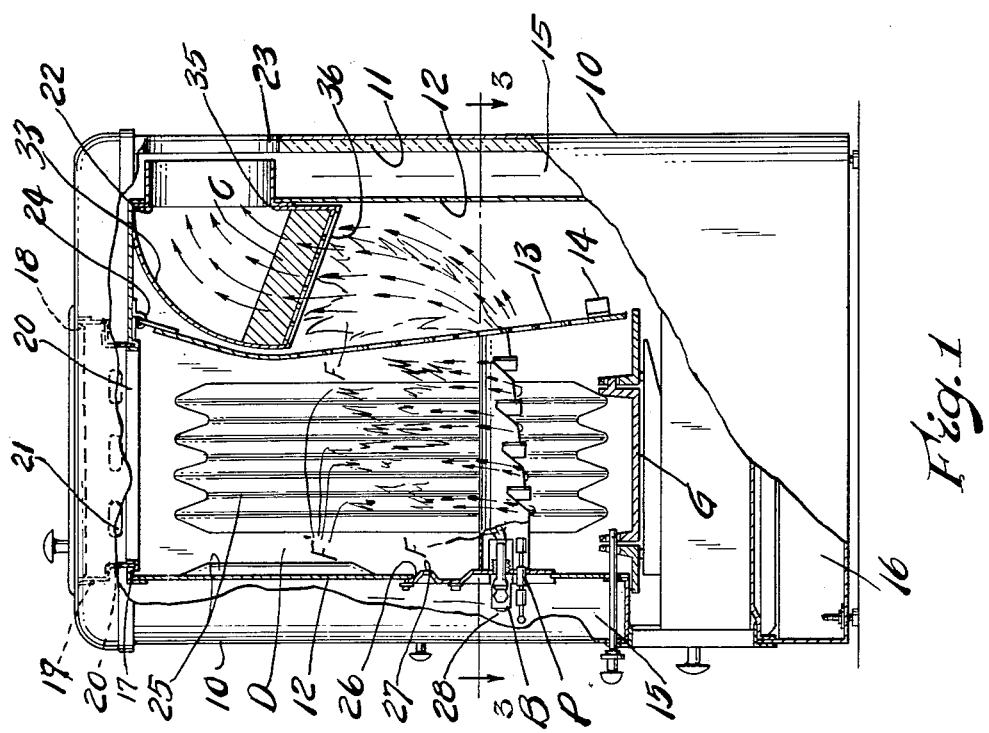
FIG. 1 is a side elevational view of an incinerator, parts being broken away to show the burner, burner shield, and corrugated side walls of the combustion chamber, the numerous arrows indicating the direction of travel of the tortuous flame streams.
Figure 3:
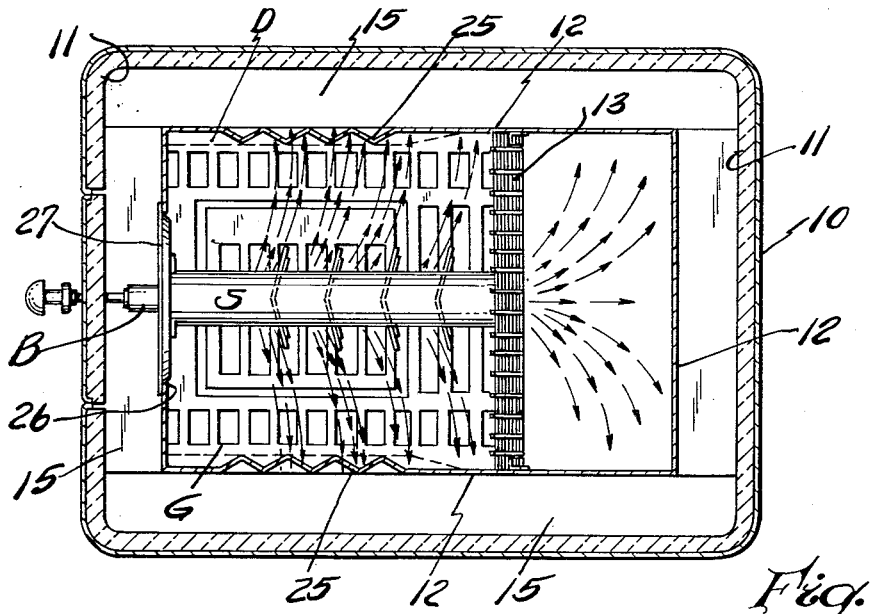
FIG. 3 is a transverse sectional plan view taken on the line 3—3 of FIG. 1.

A burner shield S is mounted in the front wall of the combustion chamber as shown in FIGS. 1, 2 and 3 of the drawings, said burner shield being preferably, but not necessarily, cylindrical in cross section, and being designed to shield the burner flame and prevent ignition of the garbage or refuse by the pilot flame, until the main burner is turned on, thus accomplishing constant non-smoldering dehydration all through the non-burning period, resulting in more rapid ignition, and giving off less vapor at the time the burning process takes place.

The shield S also forms an arch support for the wet garbage and debris, the front end of the shield being flanged as at 29 to permit securing it to the burner panel 27, and the rear end is supported by a leg 30 as shown.

Figure 5:
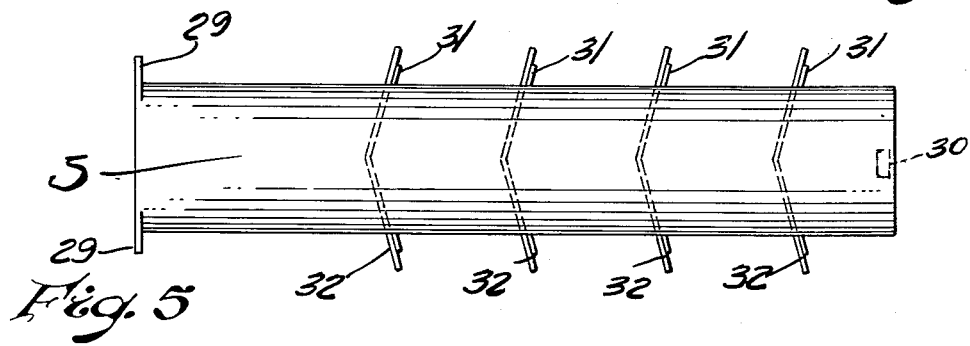
FIG. 5 is a top plan view thereof.
Figure 4:
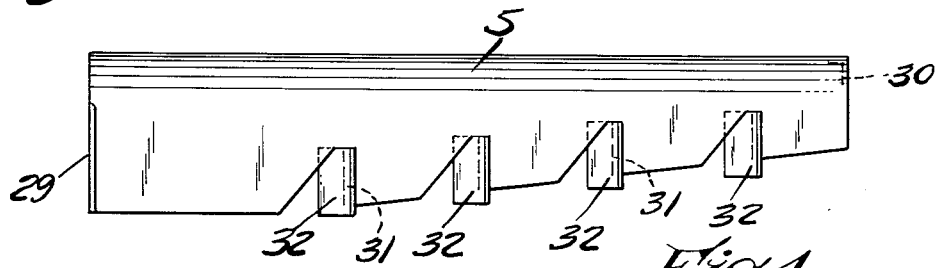
FIG. 4 is an enlarged side elevational view of the burner shield.
Figure 6:
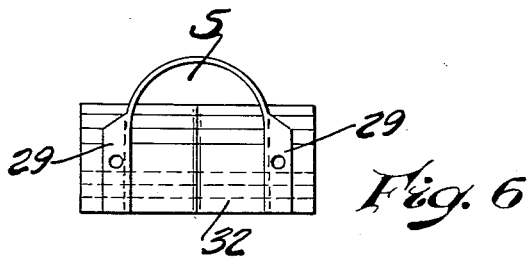
FIG. 6 is a rear elevational view.

The lower edge of the body of the shield S is upwardly tapered, the edges being formed with vertically graduated, longitudinally spaced, tooth-shaped cut-outs 31, and deflector plates 32 span the shield and are mounted in said cut-outs, the wings of the plates projecting beyond the side walls of the shield and leading angularly rearwardly all as clearly shown in FIGS. 4 and 5 of the drawings.

Wall means 33 providing a secondary combustion chamber is mounted in the upper end of the space between the division plate 13 and the rear wall of the casing 12 and is formed with a cylindrical outlet opening 35 disposed in alignment with opening 22, the lower end 36 of the holder being open, and a catalyst bed C forms a closure for said open end so that all off-gases from the combustion chamber must pass through said bed to reach the outlet flue.

When the main burner B is turned on, the main torch-like flame F shoots rearwards through the burner shield, and inasmuch as the top edge of each longitudinally spaced deflector plate 32 projects slightly above the plate directly in front of it, each plate will shear off a portion of the torch-like flame body F and divert it laterally toward the side walls of the combustion chamber, all as indicated by the numerous arrows shown in FIG. 3 of the drawing.

The main body of the flame F leads through the rear open end of the shield, into the combustion gas collection section of the primary combustion chamber in a long flame, burning off adjacent off-gases that are present, and thence the flame F leads upwardly to the catalyst bed C. The intense heat from the main flame, plus radiant heat from the shield and deflector plates destroys the distillate in the off-gases and pre-heats them, thus materially reducing the amount of smoke and obnoxious odors before the gases enter the catalyst, where all gases are consumed and complete combustion is accomplished.

The individual diverted flame sections F', sheared off by the deflector plates, attack the refuse over the entire bottom area of the charge, and burn paths through the refuse to the corrugations in the side walls, thus completely enveloping the mass of refuse in flames, while the main torch flame F flows through the shield and out the end thereof, thence being drawn upward against the lower face of the catalyst bed, maintaining it a temperature sufficient to burn all off gases flowing from the burning garbage and refuse.

From the foregoing description it will be obvious that I have perfected a very simple, practical and efficient incinerator construction for burning refuse of all kinds and eliminating undesirable odors and smoke.

What I claim is:

1. In an incinerator for combusting refuse, garbage, and the like; a casing providing a combustion chamber; a generally horizontal, longitudinally extending shield mounted in said combustion chamber; flue means for said combustion chamber leading therefrom; burner means supported in said casing under said shield having a terminal fuel issuing surface portion with a generally horizontal axis generally parallel with the shield for issuing a fuel fluid in an axial, longitudinal stream providing an elongate, torch-like flame; said shield for said burner means extending longitudinally a substantial distance beyond said fuel issuing surface to protect the flame; a plurality of deflector members supported by said casing longitudinally outward of said fuel issuing surface and extending transversely to the axis of the fuel issuing surface portion toward the axis of the fuel issuing surface portion into the path of the flame for deflecting portions of said torch-like flame outwardly; and grate means in said combustion chamber for supporting a charge of refuse, garbage, and the like adjacent said shield and said deflector members to receive the portions of flame directed outwardly; said deflector members being longitudinally spaced along said shield and incrementally extending a little further inwardly relative to the axis of the fuel issuing surface portion so that, proceeding from the said deflector member nearest the burner means, incremental portions of the flame remaining are successively peeled off; a deflector member near said burner means extending inwardly toward the axis of the fuel issuing surface portion and terminating substantially at one edge of said fuel issuing surface portion, and the outermost deflector member extending beyond said edge of the fuel issuing surface portion to substantially the diametrically opposite edge of said fuel issuing surface portion.

2. In an incinerator for combusting refuse, garbage, and the like; a casing providing a combustion chamber; a generally horizontal, longitudinally extending shield mounted in said combustion chamber; flue means for said combustion chamber leading therefrom; burner means supported in said casing under the top of said shield having a fuel issuing surface portion with a generally horizontal axis generally parallel with said shield for issuing a fuel fluid in an axial, longitudinal stream providing an elongate, torch-like flame; said shield for said burner means extending longitudinally a substantial distance beyond said fuel issuing surface portion to protect the flame; longitudinally spaced deflector members supported in said casing longitudinally outward of said fuel issuing surface portion below the top of said shield, extending transversely to the axis of the fuel issuing surface portion and leading toward the axis of the fuel issuing surface portion into the path of the flame for deflecting portions of said torch-like flame from the body thereof laterally outwardly; and grate means in said combustion chamber for supporting a charge of garbage, refuse, and the like adjacent said shield and deflector members to receive the portions of flame directed outwardly; said deflector members, proceeding outwardly from the said deflector member nearest said burner means, being in vertically offset relation with said deflector members, proceeding longitudinally from the said deflector member nearest the burner means, successively extending a little further upwardly relative to the shield to peel off incremental portions of the flame remaining successively.

3. In an incinerator for combusting refuse, garbage, and the like; a casing providing a primary combustion chamber; wall means forming a separated, secondary chamber within said casing having an opening communicating with said primary combustion chamber; flue means communicating with and leading away from said secondary chamber out of said casing; a generally horizontal, longitudinally extending shield mounted in said primary combustion chamber and extending toward said secondary chamber; grate means in said primary combustion chamber for supporting refuse, garbage, and the like adjacent the shield; burner means supported in said casing under the top of said shield having a terminal fuel issuing surface portion with a generally horizontal axis for issuing a fuel fluid in an axial, longitudinal stream providing an elongate, torch-like flame directed axially toward said secondary chamber; said shield for the burner means extending longitudinally a substantial distance beyond said fuel issuing surface to protect the flame; and diverter fin members supported from the shield longitudinally outward of said burner means extending transversely to the shield and leading from the shield toward the axis of the fuel issuing surface portion into the path of the flame for diverting portions of the torch-like flame outwardly of the shield to said refuse, garbage, and the like while another portion of the flame proceeds from the shield toward the secondary combustion chamber; said fin members being longitudinally spaced along said shield and having surfaces forming deflecting means which substantially span said shield, said members as they proceed outwardly from the said fin member nearest said burner means incrementally extending a little further inwardly relative to the axis of the said fuel issuing surface portion to peel off incremental portions of the flame remaining successively.

4. In an incinerator for combusting refuse, garbage, and the like; a casing providing a primary combustion chamber; wall means forming a separated, secondary chamber within said casing having an opening communicating with said primary combustion chamber; flue means communicating with and leading away from said secondary chamber out of said casing; a generally horizontal, longitudinally extending shield mounted in said primary combustion chamber and extending toward said secondary chamber; grate means in said primary combustion chamber for supporting refuse, garbage, and the like adjacent the shield; burner means supported in said casing under the top of said shield having a terminal fuel issuing surface portion with a generally horizontal axis for issuing a fuel fluid in an axial, longitudinal stream providing an elongate, torch-like flame directed axially toward said secondary chamber; said shield for the burner means extending longitudinally a substantial distance beyond said fuel issuing surface to protect the flame; and diverter fin members supported from the shield longitudinally outward of said burner means extending transversely crosswise of the shield and leading from the shield toward the axis of the fuel issuing surface portion into the path of the flame for diverting portions of the torch-like flame outwardly of the shield to refuse in the primary combustion chamber while another portion of the flame proceeds from the shield toward the secondary combustion chamber; said fin members being longitudinally spaced along said shield and spanning said shield below the shield, the fin members proceeding outwardly from the fin member nearest said burner means successively extending a little further upwardly relative to the shield to peel off incremental portions of the flame remaining.

5. The combination defined in claim 1 in which said casing includes a side wall with generally vertically extending channels therein laterally opposite at least some of said deflector members.

6. The combination defined in claim 3 in which said casing has side wall sections with generally vertically extending channels therein laterally opposite said fin members.

References Cited in the file of this patent

UNITED STATES PATENTS

| | | |
|---|---|---|
| 1,156,691 | Kahn | Oct. 12, 1915 |
| 1,218,325 | Shannon | Mar. 5, 1917 |
| 1,715,954 | Schuetz | June 4, 1929 |
| 1,996,098 | Chase | Apr. 2, 1935 |
| 2,157,643 | Westwick | May 9, 1939 |
| 2,364,286 | Furlong | Dec. 5, 1944 |
| 2,562,270 | Hebert | July 31, 1951 |
| 2,646,758 | Greemen | July 28, 1953 |
| 2,658,742 | Suter | Nov. 10, 1953 |
| 2,702,012 | Weggel | Feb. 15, 1955 |
| 2,711,139 | Martin | June 21, 1955 |
| 2,739,547 | Triggs | Mar. 27, 1956 |
| 2,845,882 | Bratton | Aug. 5, 1958 |
| 2,847,951 | Triggs | Aug. 19, 1958 |